(12) United States Patent
Wang

(10) Patent No.: US 11,001,106 B2
(45) Date of Patent: May 11, 2021

(54) TIRE PRESSURE CONTROL DEVICE

(71) Applicant: Shih-Jung Wang, Taoyuan (TW)

(72) Inventor: Shih-Jung Wang, Taoyuan (TW)

( * ) Notice: Subject to any disclaimer, the term of this patent is extended or adjusted under 35 U.S.C. 154(b) by 0 days.

(21) Appl. No.: 16/726,244

(22) Filed: Dec. 24, 2019

(65) Prior Publication Data

US 2020/0406689 A1 Dec. 31, 2020

(30) Foreign Application Priority Data

Jun. 27, 2019 (TW) .................................. 108122642

(51) Int. Cl.
*B60C 23/00* (2006.01)
*B60C 23/10* (2006.01)

(52) U.S. Cl.
CPC .......... *B60C 23/003* (2013.01); *B60C 23/001* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 23/04; B60C 23/0488; B60C 23/0498; B60C 23/02; B60C 23/0401; B60C 23/0406; B60C 23/0416; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2200/02; B60C 2200/06; B60C 2200/065; B60C 23/00; B60C 23/001; B60C 23/003; B60C 23/0462; B60C 23/0471; B60C 23/0472; B60C 23/0476; B60C 9/20; B60C 9/28

USPC .................................................. 73/146–146.8
See application file for complete search history.

(56) References Cited

U.S. PATENT DOCUMENTS

| 4,583,566 | A | * | 4/1986 | Kalavitz | ................ | B60C 23/001 |
| | | | | | | 137/101.19 |
| 2006/0102268 | A1 | * | 5/2006 | Loewe | ................... | B60C 23/043 |
| | | | | | | 152/415 |
| 2007/0151648 | A1 | * | 7/2007 | Loewe | ................... | B60C 23/004 |
| | | | | | | 152/419 |

(Continued)

*Primary Examiner* — Andre J Allen
(74) *Attorney, Agent, or Firm* — Li & Cai Intellectual Property Office

(57) ABSTRACT

A tire pressure control device configured to be arranged in a vehicle includes a processing unit, a linking assembly, an air compressor, a drive switch assembly, a tire pressure measurer, and an inflation assembly. The linking assembly is connected to a wheel driving shaft of the vehicle and can be driven along with the rotation of the wheel driving shaft so as to drive the air compressor to generate a compressed air that is stored in a gas storage cylinder. The processing unit can control an air valve switch assembly of the inflation assembly to be open according to a tire pressure data measured by the tire pressure measurer so that the compressed air in the gas storage cylinder enters the tires of the wheels to increase the tire pressure of the wheels.

10 Claims, 5 Drawing Sheets

(56) References Cited

U.S. PATENT DOCUMENTS

| | | | |
|---|---|---|---|
| 2009/0048733 A1* | 2/2009 | Isono | B60C 23/004 701/36 |
| 2009/0223615 A1* | 9/2009 | Isono | B60C 23/004 152/419 |
| 2016/0052351 A1* | 2/2016 | Dilisio | B60C 23/003 701/36 |
| 2017/0080761 A1* | 3/2017 | King | B60C 23/003 |
| 2017/0087944 A1* | 3/2017 | King | B60C 23/003 |
| 2018/0170125 A1* | 6/2018 | Woodley | B60C 23/003 |
| 2018/0207999 A1* | 7/2018 | Dunning | B60C 23/003 |
| 2018/0297422 A1* | 10/2018 | Ciovnicu | B60C 23/003 |
| 2018/0304697 A1* | 10/2018 | Woodley | B60C 23/003 |
| 2018/0312017 A1* | 11/2018 | Woodley | B60C 23/003 |
| 2018/0312019 A1* | 11/2018 | Linzbach | B60C 23/003 |
| 2018/0356798 A1* | 12/2018 | Ciovnicu | B60C 23/003 |
| 2020/0031334 A1* | 1/2020 | Woodley | B60C 23/003 |
| 2020/0130437 A1* | 4/2020 | Root | B60C 23/041 |
| 2020/0139772 A1* | 5/2020 | Vogelpohl | B60C 23/00363 |

* cited by examiner

TIRE PRESSURE CONTROL DEVICE

CROSS-REFERENCE TO RELATED PATENT APPLICATION

This application claims the benefit of priority to Taiwan Patent Application No. 108122642, filed on Jun. 27, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a tire pressure control device, and more particularly to a tire pressure control device applied to a motor vehicle.

BACKGROUND OF THE DISCLOSURE

Generally, driving a vehicle with insufficient tire pressure at high speeds can result in a high risk of an accident. Therefore, several types of tire pressure measurers have been developed and made available on the market, so that users can be aware of tire pressure statuses of the vehicle in real time through devices such as mobile phones.

However, the tire pressure measurers only provide a tire pressure data to users. In practice, even if the users are made aware that the tire pressure of the vehicle is insufficient through the tire pressure measurers, they may not be able to address the tire pressure deficiency in real time, so that the vehicles are still driven with insufficient tire pressure.

SUMMARY OF THE DISCLOSURE

In response to the above-referenced technical inadequacies, the present disclosure provides a tire pressure control device to improve on the issues with the conventional tire pressure measurers, e.g., only being capable of measuring the tire pressure of the wheels of the vehicles. Insufficient tire pressure may cause unsafe driving hazards if not solved in real time.

In one aspect, the present disclosure provides a tire pressure control device configured to be arranged in a vehicle. The tire pressure control device includes a processing unit, at least one linking assembly, at least one air compressor, at least one drive switch assembly, at least one tire pressure measurer, and at least one inflation assembly. The at least one linking assembly is connected to a wheel driving shaft of the vehicle. The at least one air compressor is connected to the at least one linking assembly and a gas storage cylinder. When the at least one linking assembly is driven to work by the rotation of the wheel driving shaft, the at least one air compressor is configured to be driven by the at least one linking assembly so as to generate a compressed air that is stored in the gas storage cylinder. The at least one drive switch assembly is connected to the at least one linking assembly and the at least one air compressor, the at least one drive switch assembly is connected to the processing unit, the processing unit is configured to control the at least one drive switch assembly so that the at least one linking assembly is connected to the at least one air compressor, and the processing unit is configured to control the at least one drive switch assembly so that the at least one linking assembly is not connected to the at least one air compressor. The at least one tire pressure measurer is connected to the processing unit. The at least one tire pressure measurer is configured to measure tire pressure of one of a plurality of wheels of the vehicle so as to correspondingly generate a tire pressure data. The at least one inflation assembly is connected to the gas storage cylinder and configured to be connected to a tire of at least one of the wheels of the vehicle. The at least one inflation assembly includes an air valve switch assembly, the processing unit is connected to the air valve switch assembly, and the processing unit is configured to control the air valve switch assembly so that the compressed air in the gas storage cylinder enters the tire of the at least one of the wheels. The processing unit is configured to control the air valve switch assembly to be open according to the tire pressure data transmitted by the at least one tire pressure measurer so that the compressed air in the air storage cylinder enters the tire of the at least one of the wheels to increase the tire pressure of the tire.

Therefore, the tire pressure control device of the present disclosure includes the effects as follows. The tire pressure control device of the present disclosure can be arranged in the vehicle and can inflate the at least one of the wheels of the vehicle in time so that the tire pressure of the tire of the vehicle can be maintained within an appropriate range to significantly improve driving safety of the vehicle.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
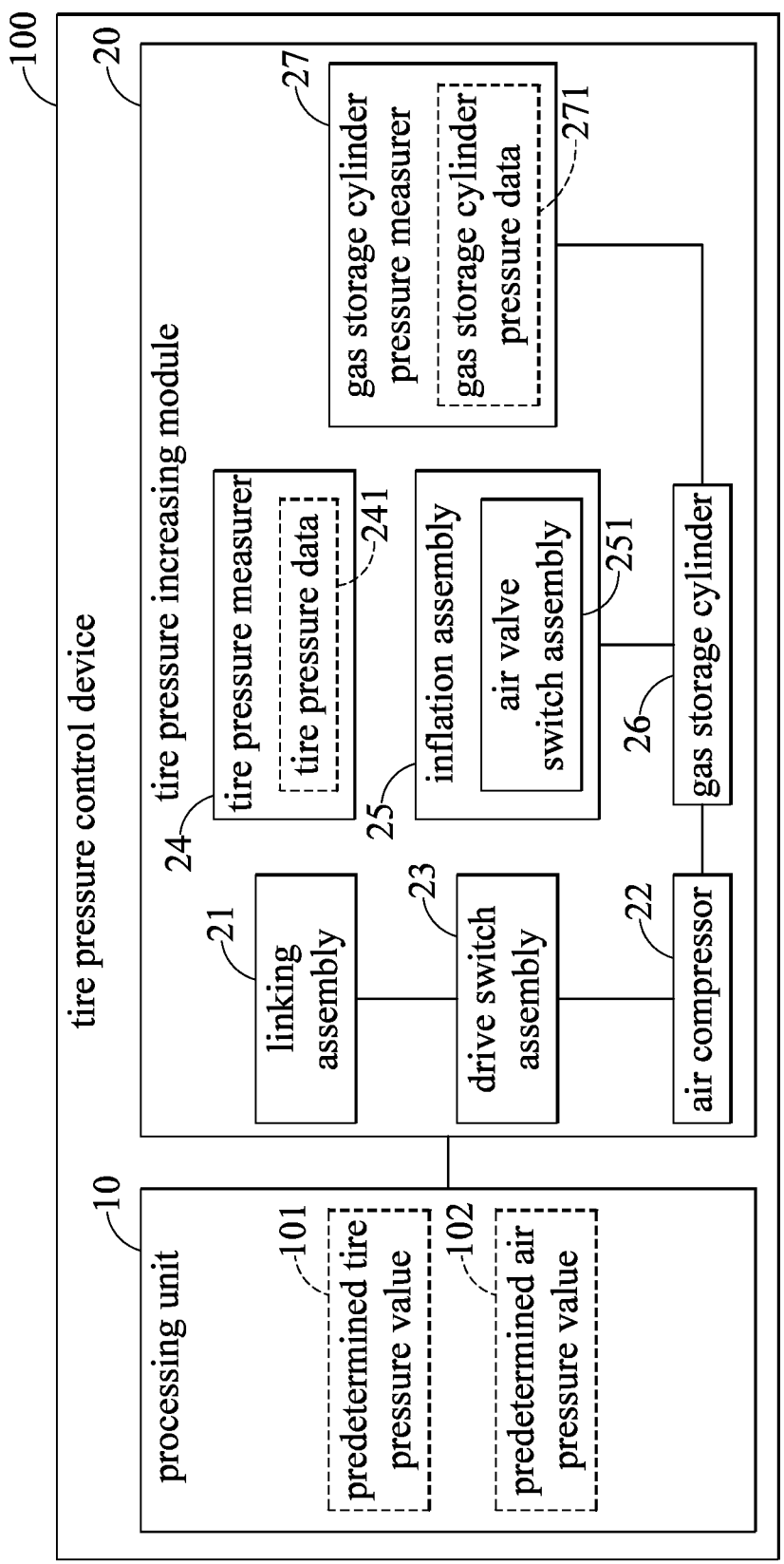
FIG. 1 is a block diagram of a tire pressure control device of the present disclosure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, FIG. 1 is a block diagram of a tire pressure control device of the present disclosure according to a first embodiment of the present disclosure. The tire pressure control device 100 includes a processing device 10 and a tire pressure increasing module 20. The tire pressure increasing module 20 includes a linking assembly 21, an air compressor 22, a drive switch assembly 23, at least one tire pressure measurer 24, at least one inflation assembly 25, and a gas storage cylinder 26. The tire pressure control device 100 is configured to be arranged in a vehicle, and the vehicle can be any type of motor vehicle such as cars, motorcycles, and trucks.

In a practical application, the number of the tire pressure increasing module 20 of the tire pressure control device 100 can be determined according to the number of a plurality of wheels of the vehicle. For example, when the tire pressure control device 100 is applied to a four-wheeled car, the number of the tire pressure increasing module 20 included in the tire pressure control device 100 can be four. Naturally, in a practical application, some members (such as the linking assembly 21, the air compressor 22, the drive switch assembly 23, and the gas storage cylinder 26) of two of the tire pressure increasing modules 20 arranged on two front wheels of the vehicles can be mutually shared. Similarly, some members of two of the tire pressure increasing modules 20 arranged on two rear wheels of the vehicles can be mutually shared.

The processing unit 10 is connected to a vehicle computer of the vehicle. In a practical application, the processing unit 10 can be an independent microcomputer. The processing unit 10 can control other electric control devices of the tire pressure control device 100, the processing unit 10 can receive each type of data and signals generated by other members of the tire pressure control device 100, the processing unit 10 can transmit the data and signals to the vehicle computer, and the processing unit 10 can store the data and signals. In other embodiments of the present disclosure, the processing unit 10 can be only a data and signal collector, and the processing unit 10 can be only a communicating medium between other members of the tire pressure control device 100 and the vehicle computer of the vehicle.

The linking assembly 21 is connected to a wheel driving shaft of the vehicle. The air compressor 22 is connected to the linking assembly 21 and the gas storage cylinder 26. When the linking assembly 21 is driven to work by the rotation of the wheel driving shaft, the air compressor 22 is configured to be driven by the linking assembly 21 so as to generate a compressed air that is stored in the gas storage cylinder 26. The drive switch assembly 23 is connected to the linking assembly 21 and the air compressor 22. The drive switch assembly 23 is connected to the processing unit 10, the processing unit 10 is configured to control the drive switch assembly 23 so that the linking assembly 21 is connected to the air compressor 22, and the processing unit 10 is configured to control the drive switch assembly 23 so that the linking assembly 21 is not connected to the air compressor 22.

Specifically, the linking assembly 21 can include a timing belt wheel, the drive switch assembly 23 can be an electromagnetic clutch, and the air compressor 22 can be a screw compressor. One end of a screw of the screw compressor is connected to the wheel driving shaft of the vehicle through the timing belt wheel and related accessories, and the electromagnetic clutch is disposed between the timing belt wheel and the wheel driving shaft. The processing unit 10 can work through the electromagnetic clutch so that the timing belt wheel and screw compressor connected to the timing belt wheel are or are not connected to the wheel driving shaft. That is, the processing unit 10 can determine whether the screw compressor rotates with the wheel driving shaft through the electromagnetic clutch. The practical implementation method of the linking assembly 21 and the drive switch assembly 23 can be changed according to practical requirements, and the present disclosure is not limited thereto.

Each of the tire pressure measurers 24 can measure one of the wheels of the vehicle so as to correspondingly generate a tire pressure data 241, and each of the tire pressure measurers 24 can transmit the tire pressure data 241 to the processing unit 10 in a wireless manner (such as through Bluetooth technology). In the embodiment about the tire pressure control device 100 applied to the four-wheeled car, the tire pressure control device 100 can include four tire pressure measurers 24, and each of the tire pressure measurers 24 can correspondingly measure the tire pressure of the tire of one of the wheels. Naturally, the number of the tire pressure measurers 24 included by the tire pressure control device 100 is not limited to four. In a practical application, each of the tire pressure measurers 24 can be an internal type or an external type, and the present disclosure is not limited thereto.

The inflation assembly 25 is connected to the gas storage cylinder 26 and the tire of the at least one of the wheels of the vehicle. The inflation assembly 25 includes an air valve switch assembly 251. The processing unit 10 is connected to the air valve switch assembly 251, the processing unit 10 is configured to control the air valve switch assembly 251 to be open so that the compressed air in the gas storage cylinder 26 enters the tire of the at least one of the wheels, and the processing unit 10 is configured to control the air valve switch assembly 251 to be closed so that the compressed air in the gas storage cylinder 26 does not enter the tire of the at least one of the wheels.

According to the above, the processing unit 10 can control the air valve switch assembly 251 to be open according the tire pressure data 241 transmitted by the tire pressure measurer 24 so that the compressed air in the gas storage cylinder 26 enters the tire of the at least one of the wheels to increase the tire pressure of the tire. Specifically, when the processing unit 10 determines that the tire pressure of the tire is below a predetermined tire pressure value 101 according to the tire pressure data 241, the processing unit 10 controls the air valve switch assembly 251 to be open so that the compressed air in the gas storage cylinder 26 enters the tire of the at least one of the wheels to increase the tire pressure of the tire, further ensuring the tire pressure of the tire of the at least one of the wheels of the vehicle to be maintained within an appropriate range.

In a practical application, the tire pressure control device 100 can further include at least one gas storage cylinder pressure measurer 27. The gas storage cylinder pressure measurer 27 is configured to measure a pressure in the gas storage cylinder 26 so as to correspondingly generate a gas storage cylinder pressure data 271. The processing unit 10 can control the drive switch assembly 23 according to the gas storage cylinder pressure data 271 transmitted by the gas storage cylinder measurer 27 so that the linking assembly 21 is or is not connected to the air compressor 22.

That is, when the processing unit 10 determines that the pressure of the gas storage cylinder 26 is lower than a predetermined air pressure value 102 according to the gas storage cylinder pressure data 271, the processing unit 10 controls the drive switch assembly 23 to be open so that the linking assembly 21 is connected to the air compressor 21 and the air compressor 22 generates the compressed air that is stored in the gas storage cylinder 26. During a process of the air compressor 22 storing the compressed air into the gas storage cylinder 26, the processing unit 10 continuously receives the gas storage cylinder pressure data 271, and when the processing unit 10 determines that the pressure of the gas storage cylinder 26 reaches the predetermined air pressure value 102 according to the gas storage cylinder pressure data 271, the processing unit 10 controls the drive switch assembly 23 to be closed so that the air compressor 22 does not generate the compressed air to be stored in the gas storage cylinder 26.

Figure 2:
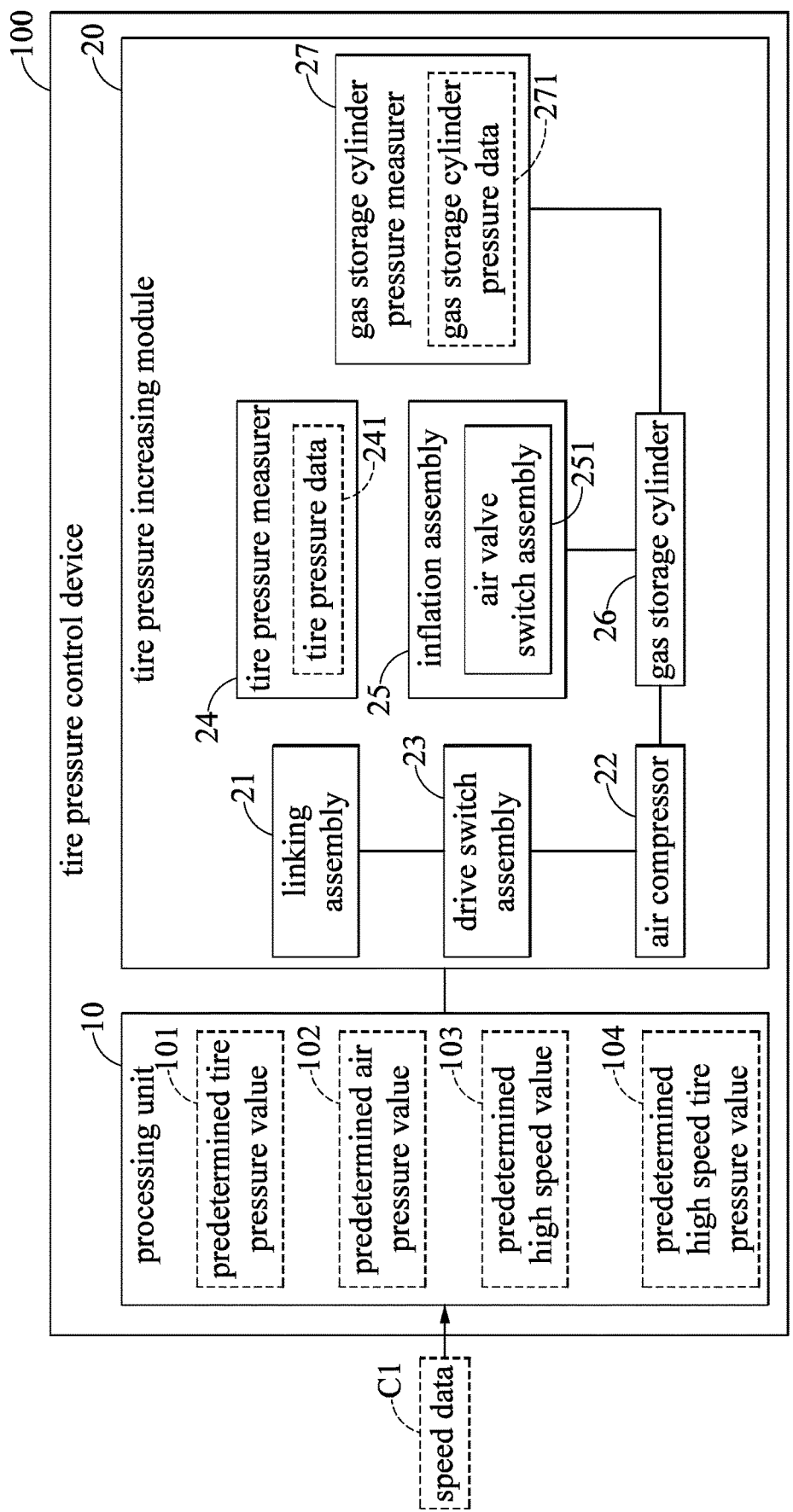
FIG. 2 is a block diagram of the tire pressure control device of the present disclosure according to a second embodiment of the present disclosure.

Referring to FIG. 2, FIG. 2 is a block diagram of the tire pressure control device of the present disclosure according to a second embodiment of the present disclosure. The difference between the present embodiment and the above embodiment is that the processing unit 10 is further configured to receive a speed data C1 transmitted by the vehicle computer of the vehicle, and the processing unit 10 can control the air valve switch assembly 251 to be open according to the speed data C1 and the tire pressure data 241 so that the compressed air in the gas storage cylinder 26 enters the tire of the at least one of the wheels to increase the tire pressure of the tire.

Specifically, when the processing unit 10 receives the speed data C1 and determines that the hourly speed of the vehicle is higher than a predetermined high speed value 103 (such as 80 km/h), the processing unit 10 can control the air valve switch assembly 251 to be open so that the compressed air in the gas storage cylinder 26 enters the tire of the at least one of the wheels to increase the tire pressure of the tire to a predetermined high speed tire pressure value 104. The predetermined high speed value 103 and the predetermined high speed tire pressure value 104 can be stored in the processing unit 10 in advance; in a practical application, the predetermined high speed value 103 and the predetermined high speed tire pressure value 104 stored in the processing unit 10 can be adjusted through a related electronic device.

In other embodiments of the present disclosure, when the processing unit 10 determines that the hourly speed of the vehicle is higher than the predetermined high speed value 103, the processing unit can take a predetermined multiple of a tire pressure value corresponding to the current tire pressure data 241 as the predetermined tire pressure value 104.

Generally, when the hourly speed of the vehicle is lower than 80 km/h and the tire pressure of the tire of the vehicle is between 28~30 pounds, the tire is in a relatively stable status; when the hourly speed of the vehicle is lower than 80 km/h and the tire pressure of the tire of the vehicle is adjusted to 32 pounds, the stability of the tire can be increased to improve driving safety. Therefore, the tire pressure control device 100 of the present embodiment can increase the tire pressure of the tire of the vehicle in time to improve driving safety because the processing unit 10 receives the speed data C1 in real time.

Figure 3:
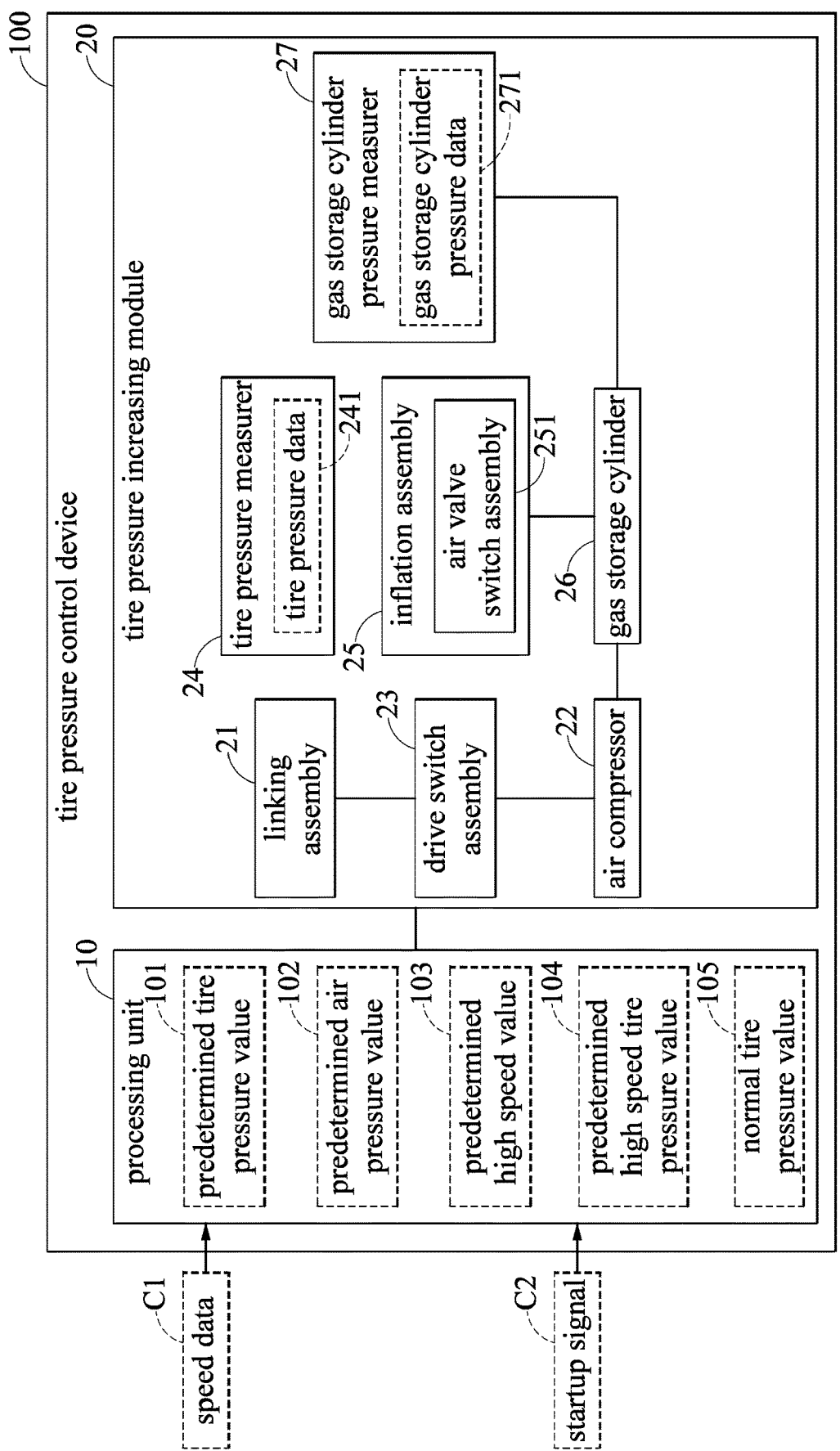
FIG. 3 is a block diagram of the tire pressure control device of the present disclosure according to a third embodiment of the present disclosure.

Referring to FIG. 3, FIG. 3 is a block diagram of the tire pressure control device of the present disclosure according to a third embodiment of the present disclosure. The difference between the present embodiment and the second embodiment is that the processing unit 10 is further configured to receive a startup signal C2 transmitted by the vehicle computer of the vehicle. When the processing unit 10 receives the startup signal C2, the processing unit 10 can control the tire pressure measurer 24 so as to receive the tire pressure data 241, and the processing unit 10 can store the tire pressure data 241 as a normal tire pressure value 105.

When the processing unit 10 determines that the hourly speed of the vehicle is higher than the predetermined high speed value 103 and the compressed air in the gas storage cylinder 26 enters the tire of the at least one of the wheels, the processing unit 10 continuously receives the tire pressure data 241 transmitted by the tire pressure measurer 24, and when the processing unit 10 determines that tire pressure of the tire of the vehicle is a predetermined multiple of the normal tire pressure value 105, the processing unit 10 can control the air valve switch assembly 251 to be closed. The predetermined multiple can be changed according to practical requirements, and the present disclosure is not limited thereto.

In a practical application, each time the processing unit 10 receives the startup signal C2, the processing unit 10 can store the tire pressure data 241 received currently as the normal tire pressure value 105; that is, each time the vehicle is restarted, the normal tire pressure value 105 originally stored in the processing unit 10 will be updated.

In a practical application, when the processing unit 10 receives the startup signal C2 and further receives the current tire pressure data 241, the processing unit 10 can determine whether the tire pressure of the at least one of the wheels of the vehicle is within a normal range; when the processing unit 10 determines that the current tire pressure is lower than the normal range, the processing unit 10 can control the air valve switch assembly 251 so that the compressed air in the gas storage cylinder 26 enters the tire of the at least one of the wheels to increase the tire pressure of the tire. Until the processing unit 10 receives the tire pressure data 241 again and determines that the tire pressure of the tire is within the normal range, the processing unit 10 controls the air valve switch assembly 251 to be closed, and the processing unit 10 stores the current tire pressure data 241 as the normal tire pressure value 105.

According to the above, in a practical application, when the vehicle is started, the tire pressure of each of the tires may be different due to different loads of the vehicle. The tire pressure control device 100 of the present embodiment correspondingly adjusts the normal tire pressure value 105 according to the tire pressure when the vehicle is started, and the processing unit 10 can adjust the tire of the at least one of the wheels through the air valve switch assembly 251 according to the normal tire pressure value 105 when the vehicle is under different circumstances.

Figure 4:
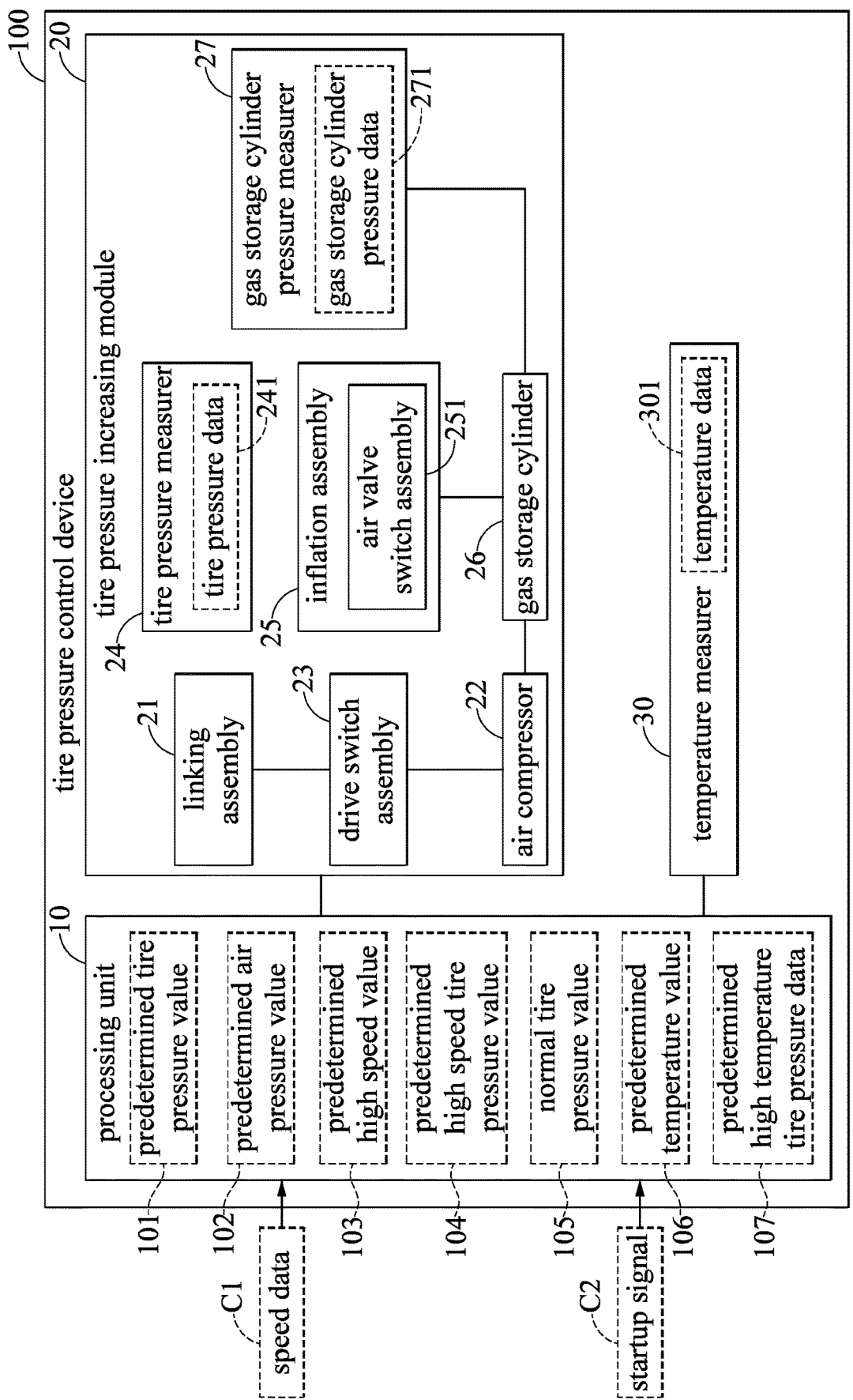
FIG. 4 is a block diagram of the tire pressure control device of the present disclosure according to a fourth embodiment of the present disclosure.

Referring to FIG. 4, FIG. 4 is a block diagram of the tire pressure control device of the present disclosure according to a fourth embodiment of the present disclosure. The difference between the present embodiment and the above embodiments is that the tire pressure control device 100 can further include at least one temperature measurer 30. The temperature measurer 30 is configured to be arranged in the vehicle. The temperature measurer 30 can measure a temperature of an environment where the vehicle is located so as to correspondingly generate a temperature data 301. The processing unit 10 is configured to receive the temperature data 301 transmitted by the temperature measurer 30, and the processing unit 10 can determine whether the temperature of the environment where the vehicle is located is higher than a predetermined temperature value 106 according to the temperature data 301. The predetermined temperature value 106 can be stored in the processing unit 10 in advance.

When the processing unit 10 determines that the temperature of the environment where the vehicle is located is higher than the predetermined high temperature value 106, the processing unit 10 can control the air valve switch assembly 251 to be open so that the compressed air in the gas storage cylinder 26 enters the tire of the at least one of the wheels to increase the tire pressure of the tire until the tire pressure reaches a predetermined high temperature tire pressure value 107. The predetermined high temperature tire pressure value 107 can be stored in the processing unit 10 in advance; or, the predetermined high temperature tire pressure value 107 can be a predetermined multiple of the normal tire pressure value 105. That is, when the normal tire pressure value 105 is updated, the predetermined high temperature tire pressure value 107 is updated accordingly.

According to the above, the tire pressure control device 100 of the present embodiment can adjust the tire pressure of the tire of the vehicle according to the temperature of the environment where the vehicle is located to improve driving safety.

Figure 5:
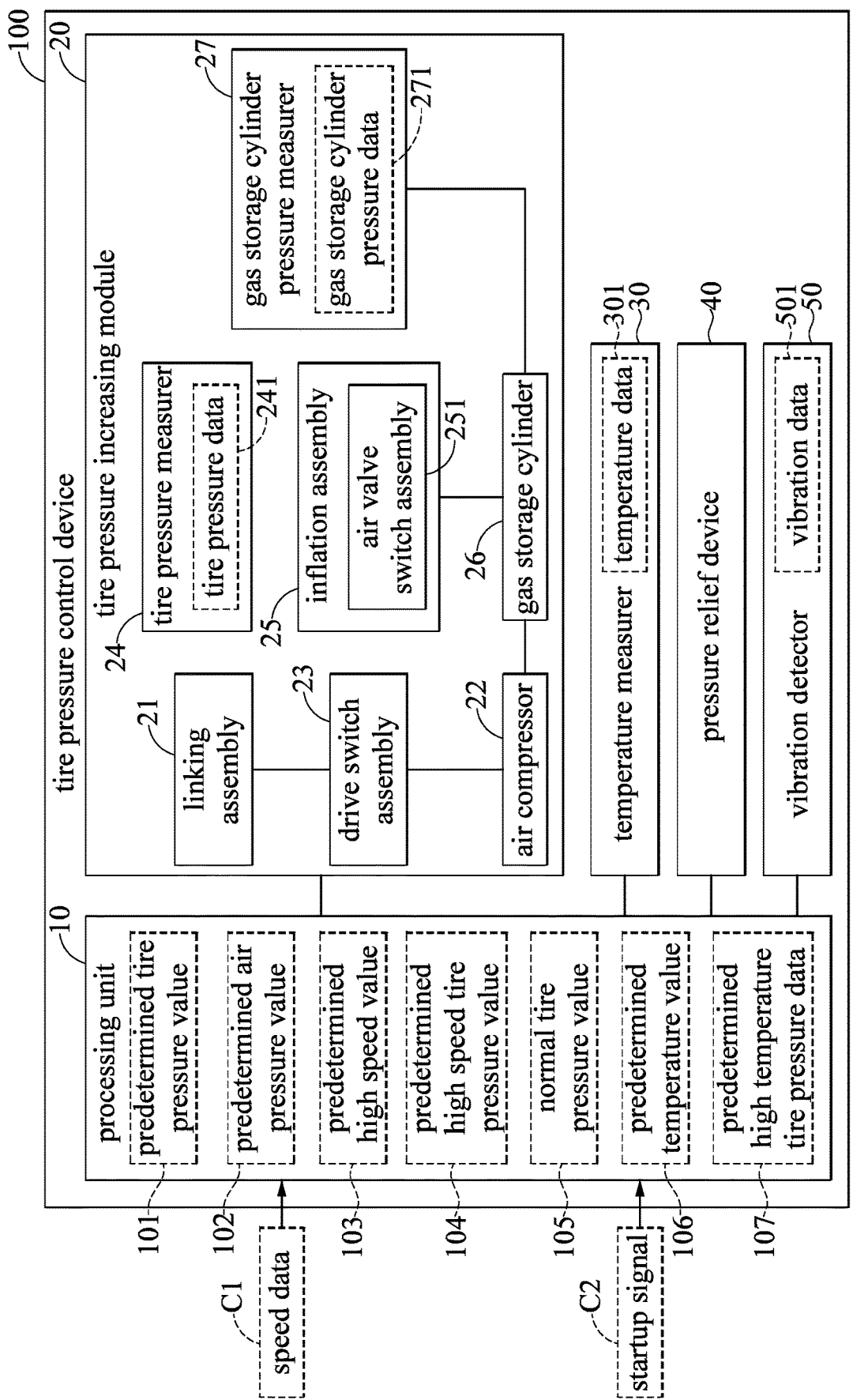
FIG. 5 is a block diagram of the tire pressure control device of the present disclosure according to a fifth embodiment of the present disclosure.

Referring to FIG. 5, FIG. 5 is a block diagram of the tire pressure control device of the present disclosure according to a fifth embodiment of the present disclosure. The difference between the present embodiment and the above embodiments is that the tire pressure control device 100 can further include at least one pressure relief device 40. The pressure relief device 40 can be arranged on one of the wheels of the vehicle, and the processing unit 10 can control the pressure relief device 40 according to the tire pressure data 241 so as to exhaust a part of the air in the tire of the at least one of the wheels of the vehicle to reduce the tire pressure of the tire. In other embodiments of the present disclosure of the tire pressure control device 100 applied to a four-wheeled car, the number of the pressure relief device 40 included in the tire pressure control device 100 can be four. Each of the four pressure relief devices 40 can be arranged outside of a wheel frame of each of the wheels, and each of the four pressure relief devices 40 is correspondingly connected to a pressure relief hole of the wheel frame. The processing unit 10 can control each of the four pressure relief devices 40 in the wireless manner; when the processing unit 10 controls the pressure relief device 40 to be open, the air in the wheel can be exhausted through the pressure relief hole and the pressure relief device 40.

In a practical application, the processing unit 10 or the vehicle computer can control the pressure relief device 40 to reduce the tire pressure of the tire of the vehicle according to a current status of the vehicle so as to increase a friction of the vehicle. For example, the tire pressure control device 100 can further include at least one vibration detector 50. The vibration detector 50 is configured to be arranged in the vehicle. The vibration detector 50 can detect a vibration status of the vehicle so as to generate a vibration data 501. The processing unit 10 can receive the vibration data 501 transmitted by the vibration detector 50, and the processing unit 10 can control the pressure relief device 40 according to the speed data C1 and the vibration data 501 so as to selectively exhaust a part of the air in the tire of the at least one of the wheels to reduce the tire pressure of the tire.

Generally, when the vehicle is driven in a low speed (such as lower than 80 km/h) on a bumpy road and the tire pressure (such as 28 pounds) of the tire of the at least one of the wheels is lower than the tire pressure (such as 30 pounds) for driving on a normal road, increasing the friction between the wheels and the ground can further improve driving safety. Therefore, the tire pressure control device 100 of the present embodiment receives the vibration data 501 in real time so as to reduce the tire pressure of the tire of the at least one of the wheels of the vehicle in time to improve driving safety.

In the above embodiments, the processing unit 10 inflates the tire to increase tire pressure when determining that the speed of the vehicle is higher than the predetermined high speed value 103; relatively, the processing unit 10 can determine whether the speed of the vehicle is lower than the predetermined high speed value 103 according to the speed data C1, and when the processing unit 10 determines that the speed of the vehicle is lower than the predetermined high speed value 103 and the tire pressure is higher than the predetermined tire pressure value 101, the processing unit 10 can control the pressure relief device 40 to exhaust a part of the air in the tire to reduce the tire pressure of the tire.

In conclusion, the tire pressure control device of the present disclosure can control the compressed air in the gas storage cylinder to enter the tire in time, or control the pressure relief device to exhaust the air in the tire in time according to the tire pressure measured by the tire pressure measurer with the current speed of the vehicle, the temperature of the environment where the vehicle is located, and the detection result of the vibration detector. Therefore, driving safety of users can be largely improved. In other words, different from a common tire pressure measurer, the tire pressure control device of the present disclosure not only measures the tire pressure of the vehicle in real time, but also adjusts the tire pressure of the vehicle in time according to a vehicle status. In addition, the tire pressure control device of the present disclosure improves on the issues associated with the conventional tire pressure measurer having only alarm function, and not being capable of addressing the insufficient tire pressure in time, which may result in driving hazards.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A tire pressure control device configured to be arranged in a vehicle, comprising:
    a processing unit;
    at least one linking assembly configured to be connected to a wheel driving shaft of the vehicle;
    at least one air compressor connected to the at least one linking assembly and a gas storage cylinder, wherein when the at least one linking assembly is driven to work by the rotation of the wheel driving shaft, the at least one air compressor is configured to be driven by the at least one linking assembly so as to generate a compressed air that is stored in the gas storage cylinder;
    at least one drive switch assembly connected to the at least one linking assembly and the at least one air compressor, wherein the at least one drive switch assembly is connected to the processing unit, and the processing unit is configured to control the at least one drive switch assembly so that the at least one linking assembly is connected to the at least one air compressor, or control the at least one drive switch assembly so that the at least one linking assembly is not connected to the at least one air compressor;
    at least one tire pressure measurer configured to measure tire pressure of one of a plurality of wheels of the vehicle so as to correspondingly generate a tire pressure data; and
    at least one inflation assembly connected to the gas storage cylinder, wherein the at least one inflation assembly is configured to be connected to a tire of at least one of the wheels of the vehicle, wherein the at least one inflation assembly includes an air valve switch assembly, the processing unit is connected to the air valve switch assembly, and the processing unit is configured to control the air valve switch assembly so that the compressed air in the gas storage cylinder enters the tire of the at least one of the wheels,
    wherein the processing unit is configured to control the air valve switch assembly to be open according to the tire pressure data transmitted by the at least one tire pressure measurer so that the compressed air in the air storage cylinder enters the tire of the at least one of the wheels to increase the tire pressure of the tire.

2. The tire pressure control device according to claim 1, further comprising a gas storage cylinder pressure measurer configured to measure pressure in the gas storage cylinder, wherein the gas storage cylinder pressure measurer is connected to the processing unit, and wherein the processing unit is configured to control the at least one drive switch assembly according to a gas storage cylinder pressure data transmitted by the gas storage cylinder pressure measurer so that the at least one linking assembly is connected to the at least one air compressor or the at least one linking assembly is not connected to the at least one air compressor.

3. The tire pressure control device according to claim 2, wherein the at least one drive switch assembly is an electromagnetic clutch, and the at least one air compressor is a screw compressor.

4. The tire pressure control device according to claim 1, wherein the processing unit is configured to receive a speed data transmitted by a vehicle computer of the vehicle, and the processing unit is configured to control the air valve switch assembly to be open according to the speed data and the tire pressure data so that the compressed air in the gas storage cylinder enters the tire of the at least one of the wheels to increase the tire pressure of the tire.

5. The tire pressure control device according to claim 4, wherein when the processing unit receives the speed data and determines that an hourly speed of the vehicle is higher than a predetermined high speed value, the processing unit is configured to control the air valve switch assembly so that the compressed air in the gas storage cylinder enters the tire of the at least one of the wheels to increase the tire pressure of the tire.

6. The tire pressure control device according to claim 5, wherein the processing unit is configured to receive a startup signal transmitted by the vehicle computer, when the processing unit receives the startup signal, the processing unit is configured to control the at least one tire pressure measurer so as to receive the tire pressure data, and the processing unit is configured to store the tire pressure data as a normal tire pressure value, and wherein when the processing unit determines that the hourly speed of the vehicle is higher than the predetermined high speed value and the compressed air in the gas storage cylinder enters the tire of the at least one of the wheels, the processing unit controls the air valve switch assembly to be closed in response to the processing unit receiving the tire pressure data and determining that the tire pressure of the tire of the at least one of the wheels has reached a predetermined multiple of the normal tire pressure value.

7. The tire pressure control device according to claim 6, wherein when the processing unit receives the startup signal, the processing unit is configured to control the at least one tire pressure measurer so as to receive the tire pressure data, and the processing unit is configured to store the tire pressure data as the normal tire pressure value so as to update the normal tire pressure originally stored in the processing unit.

8. The tire pressure control device according to claim 1, further comprising at least one temperature measurer configured to be arranged in the vehicle, wherein the at least one temperature measurer is configured to measure a temperature of an environment where the vehicle is located so as to correspondingly generate a temperature data, wherein the processing unit is configured to receive the temperature data transmitted by the at least one temperature measurer, and wherein when the processing unit determines that the temperature of the environment where the vehicle is located is higher than a predetermined temperature value according to the temperature data, the processing unit controls the air valve switch assembly to be open so that the compressed air in the gas storage cylinder enters the tire of the at least one of the wheels to increase the tire pressure of the tire.

9. The tire pressure control device according to claim 1, further comprising at least one pressure relief device configured to be arranged on the at least one of the wheels of the vehicle, wherein the processing unit is connected to the at least one pressure relief device, and the processing unit is configured to control the at least one pressure relief device according to the tire pressure data so as to exhaust a part of the air in the tire of the at least one of the wheels of the vehicle to reduce the tire pressure of the tire.

10. The tire pressure control device according to claim 9, further comprising at least one vibration detector configured to be arranged in the vehicle, wherein the at least one vibration detector is configured to detect a vibration status of the vehicle so as to correspondingly generate a vibration data, and the processing unit is configured to receive the vibration data transmitted by the at least one vibration detector, and wherein the processing unit is configured to control the at least one pressure relief device according to the speed data and the vibration data so as to selectively exhaust a part of the air in the tire of the at least one of the wheels of the vehicle to reduce the tire pressure of the tire.

\* \* \* \* \*